United States Patent [19]
Nashiki

[11] Patent Number: 6,025,659
[45] Date of Patent: Feb. 15, 2000

[54] SYNCHRONOUS MOTOR WITH MOVABLE PART HAVING PERMANENT MAGNETS

[75] Inventor: Masayuki Nashiki, Niwa-gun, Japan

[73] Assignee: Okuma Corporation, Nagoya, Japan

[21] Appl. No.: 09/139,015

[22] Filed: Aug. 24, 1998

[30] Foreign Application Priority Data

Sep. 2, 1997 [JP] Japan ..................................... 9-236880

[51] Int. Cl.[7] ............................. H02K 41/00; H02K 1/06
[52] U.S. Cl. ............................................................. 310/12
[58] Field of Search ................................. 310/12, 13, 14; 318/135

[56] References Cited

U.S. PATENT DOCUMENTS 5,218,250 6/1993 Nakagawa ................................. 310/12

Primary Examiner—Nestor Ramirez
Assistant Examiner—Judson H. Jones
Attorney, Agent, or Firm—Oliff & Berridge, PLC

[57] ABSTRACT

The object of the present invention is to increase thrust generation of a linear motor, and to achieve miniaturization and the low price of a linear motor by improving a magnetic circuit. In order to achieve the object, the present invention provides a linear motor including a magnetic yoke for the north pole 8 which is commonly connected to the magnetic pole N of permanent magnets 4, a magnetic yoke for the south pole 9 which is commonly connected to the pole S of permanent magnets 4, a magnetic north pole 5 forming a part of magnetic yoke for the north pole 8 and being mounted on the surface of a slider 3, a magnetic south pole 6 forming a part of magnetic yoke for the south pole 9 and being mounted on the surface of a slider 3 so as to be alternately located in a traverse direction of the slider 3 with the magnetic north pole 5.

5 Claims, 12 Drawing Sheets

SECTION E - F
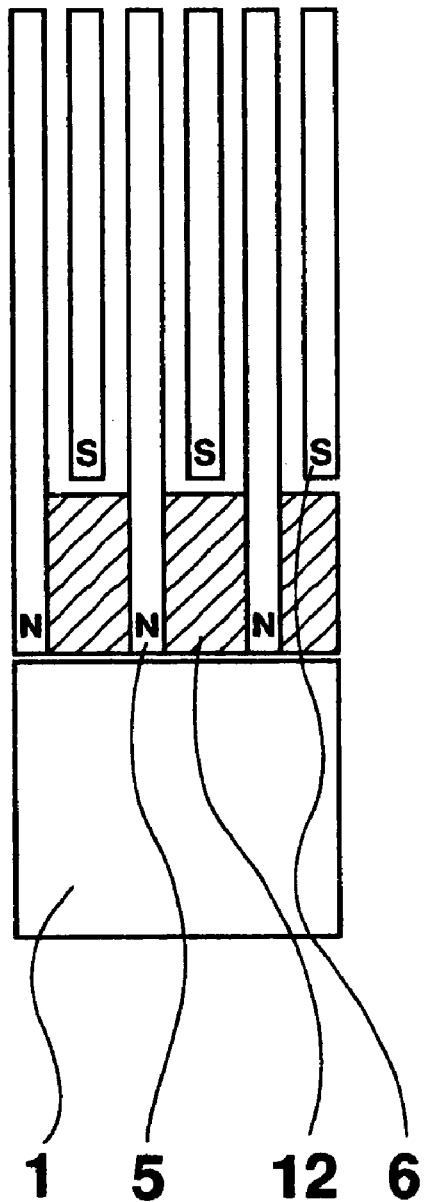
SECTION G - H
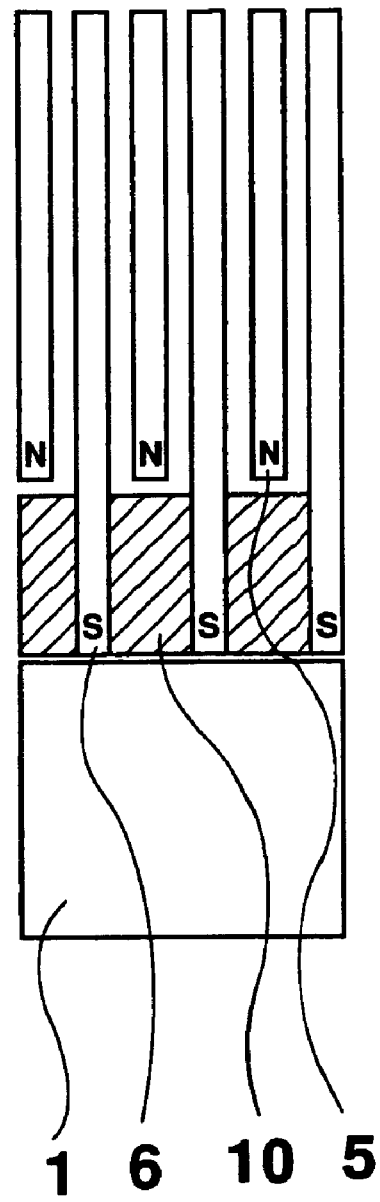
Fig. 6

SYNCHRONOUS MOTOR WITH MOVABLE PART HAVING PERMANENT MAGNETS

BACKGROUND OF THE INVENTION

1. Field of the Invention

This invention relates to a structure of a synchronous motor with movable part having permanent magnets, and more particular to a motor structure which is preferable to a linear motor.

2. Description of the Related Art

FIG. 11 shows a cross section of a conventional vernier-type linear motor incorporating permanent magnets.

Numeral 3 is a slider which forms a movable part and 7 is one of the slots on the slider 3 indicated by S1 to S12. A bipolar three-phase alternating current winding, commonly used for such a rotation-type induction motor, is wound to be aligned in a line in each slot. FIG. 3 illustrates an example of their wire-wound diagram. R, S, and T are terminals of three-phase alternating current windings, and N is a neutral point. Numeral 15 is a tooth of the slider 3. The width of the front end of respective teeth 15 is almost the same as that of respective inlets of slots 7 so that their magnetic reluctance change between high and low alternatively according to a movement of the slider 3 in the direction shown by the arrow i.e. a side-to-side direction from a stator 1.

Numeral 1 is a stator and alternating poles N and S of permanent magnets are attached at regular intervals on its surface.

From Fleming's rule, the force F generated by a single turn of winding for a motor is generally derived as follows:

$$F=B \cdot I \cdot L$$

where B is magnetic flux density, I is electric current, and L is effective length of an electric wire. And the motor power P is represented as follows:

$$P=F \cdot dX/dt$$

where X is the distance in the movement direction of the slider, dX/dt is the velocity of the slider.

Taking voltage here to be V, the power P is represented as follows:

$$P=V \cdot I=d\phi/dt \cdot I$$

where $\phi$ is flux linkage of a single turn of winding. By the neglect of variations in magnetic energy occurred within a linear motor, the both formulas above lead with, $$P=F \cdot dX/dt=d\phi/dt \cdot I$$

As a consequence, the thrust force F produced by a linear motor is derived as follows:

$$F=d\phi/dX \cdot I$$

That is, the thrust force F produced by a linear motor is proportional to the rate of change in location $d\phi/dX$ of magnetic flux $\phi$ produced by linkage against winding.

Accordingly with reference to the case, for example, of the slider-and-stator structure identical to that shown in FIG. 11 but comprising a linear motor of bipolar permanent magnet type, which is not illustrated, produced torque T (the rate of change in location d $\phi/dX$ of magnetic flux $\phi$ produced by linkage against winding) is estimated to be simply proportional to magnetic flux B.

The linear motor shown in FIG. 11 is considered here with the same manner as mentioned above. Suppose that, for example, a single turn of winding is wound through a slot S2 and S8 in the direction from upper surface to bottom of the paper, in which FIG. 11 is illustrated, at S2 and in the direction from down surface to top at S8. Speaking of the rate of change in location of flux linkage $\phi$ against the winding wound from the slot 2 to 8 in this case, represented by d $\phi/dX \approx \Delta\phi/\Delta X$, infinitesimal movement of the slider of $\Delta X$ to the right causes infinitesimal change in magnetic flux $\Delta\phi$ as increase in magnetic flux of the pole N corresponding to the infinitesimal change in position $\phi X$ on each tooth between the slot 2 and 8 of the slider. As a result, a high rate of change in magnetic flux $d\phi/dX$ is generated by the position of the winding. Accordingly, the rate of change in location $d\phi/dX$ of magnetic flux $\phi$ would show fivefold or sixfold increase as compared to the above-mentioned linear motor of bipolar permanent magnet type in simple theory and ditto for generated thrust force. As has been said, a vernier-type linear motor is characterized by generation of high thrust through a principle thereof. However, the effects by limitations of driving frequency and inductance of winding, in general, make high-velocity drive of the linear motor difficult because the driving frequency for controllable drive in this example becomes approximately 6 times.

The linear motor shown in FIG. 11 has a problem that effective use has not been made of magnetic flux of respective permanent magnet. Taking a look, for example, at magnetic flux occurred on the protruding pole of the slider located between the slot S2 and S3, the protruding pole of the slider faces the magnetic pole N of a permanent magnet over a slight gap. This leads magnetic flux of the pole N to be appeared on the protruding pole of the slider, which is, at the same time, influenced by many components which close magnetic flux between the magnetic pole N and the pole S because of leakage flux from the adjoining pole S at each side of the pole N through a nonmagnetic part such as the gap between protruding poles of the slider. The portion of magnetic flux, which closes the magnetic pole S within magnetic flux of the magnetic pole N, is not utilized in a driving operation. Accordingly, the impossibility of making full use of magnetic flux of the magnetic pole N on the protruding pole of the slider located between the slot S2 and S3, and the same on the other respective protruding poles of the slider causes that effective magnetic flux is not obtained enough. As a result, this produces a problem that the thrust of a motor decreases even when the motor is appropriately energized.

The leakage flux of the magnetic pole S is explained below through the magnetic properties of a permanent magnet. B0 to H0 indicated in FIG. 12 is a characteristic example as to typical magnetic flux density B and magnetomotive force H of a rare-earth magnet. The operating point of the pole N of a magnet opposing to the protruding pole of the slider between the slot S2 and S3 is OP1. At this point, a magnetomotive force H1 mainly functions as the magnetomotive force to an air-gap part and its magnetic flux density is B1. On the other hand, the operating point of the adjoining magnetic poles S of each side of the pole N is OP2. At this point, as leakage flux in a nonmagnetic part such as a gap between the slot S2 and S3 is generated, a high magnetomotive force H2 acts and magnetic flux density therein is B2. The portion of B2 closes magnetic flux between adjoining magnets and does not function effectively for a linear motor. As a consequence, magnetic flux working as an action of a linear motor is that equal to the magnetic flux density of B1 minus B2. Depending on the structures of a linear motor the value of magnetic flux varies, but the value of B2 may often be more than the half of B1 so that the half portion of the power of a permanent magnet can not be utilized in many cases.

One of the other problems is that maximum magnetic flux density in a magnetic pole part on the stator is only 1.0 tesla when a rare-earth magnet, whose residual flux density is high, is used, as opposed to that in magnetic steel of a protruding pole on the slider is high as 1.7 tesla, and limitations in structure of the stator interfere with increasing magnetic flux density. It has been expected an increase of motor torque according to an increase of magnetic flux density in each magnetic pole of the stator.

Another problem is that if the driving range of a linear motor is long, the cost of a linear motor becomes high because an expensive permanent magnet attached on a stator requires the amount being proportional to the driving range.

And the other problem is that if a linear motor is applied to a feed driver of a machine tool and so on, the place attached a permanent magnet thereon needs to be strictly covered with consideration given to avoid adhesion of steel dust existing in an ambient environment. This also causes an increase of the cost spent on cover.

SUMMARY OF THE INVENTION

Therefore it is an object of the present invention to provide a common magnetic yoke for the pole N connected to each pole N of respective permanent magnets and that for the pole S in order to make effective use of the power of each permanent magnet within the entire linear motor.

Another object of the present invention is to provide a linear motor of vernier structure by varying the pitch of magnetic poles on a slider with the pitch of larger parts and smaller parts of magnetic reluctance on a stator.

An additional object of the present invention is to provide an auxiliary magnetic pole N that connects the above-stated magnetic pole N to adjoining next one and an auxiliary magnetic pole S that connects the above-stated magnetic pole S to adjoining next one.

Another object of the present invention is to provide a slider incorporating a common permanent magnet, which is commonly connected to each magnetic pole therein.

A further object of the present invention is to provide a slider on which winding of a linear motor is attached in the position where the aforementioned action of a magnetic circuit is not interfered by the winding.

Forming a common magnetic circuit for the magnetic pole N and the pole S respectively with a magnetic yoke, the magnetomotive force of respective magnetic poles occurred on a stator part becomes almost equivalent to each other. As a consequence of this, the magnetic flux existing in non-magnetic part such as a gap or a void can be roughly proportional to magnetic reluctance therein. This means that an adverse phenomenon in which a great leakage flux appears as in the past by the action of high magnetomotive force where magnet reluctance is high, could decrease.

It would be possible to achieve 1.7 tesla of high magnetic flux density with electromagnetic steel as the material for a magnetic pole of a stator.

In order to use a permanent magnet as to be common for each magnetic pole and use a magnetic flux density with the value close to saturation flux density of magnetic steel, it is required to place a magnetic circuit of the pole N, that of the pole S, and a insulating part in an efficient manner within a slider. However, there has been a problem that the space within a slider couldn't be utilized effectively. To be more specific, for the purpose of switching magnetic flux density appeared on a salient part of a slider between the magnetic pole N and the pole S, and achieving the value close to 1.7 tesla, there was not enough space for the inductive magnetic path to induce magnetic flux from each magnet pole part on the surface of a slider to a common magnetic yoke for the pole N and the pole S.

As a remedy to this, this invention provides a method of enhancing the magnetic flux density, which works effectively, of each magnetic pole part on a slider surface using the aforementioned structure of a motor. Referring in an example, when 100 of magnetic flux is required on a certain part of a slider surface, a plurality of individual permanent magnets placed close to a slider surface supply 50 of that and other individual permanent magnets placed on a different location supply the other 50 of that to magnet poles on above-mentioned part of a slider surface through a common magnetic yoke and said inductive magnetic path which is a part of the yoke. Such an operation allows said inductive magnetic path to retain only the half portion of magnetic flux required on a slider surface. This leads the generation of great magnetic flux on a slider surface and results in producing great thrust.

Moreover, placing a common permanent magnet between a common magnetic yoke for the pole N and that for the pole S, the magnetic flux generated by a slide increases further. Although the structure of a linear motor of this invention is a little more complex than that of a conventional linear motor shown in FIG. 11 and tends to generate much leakage flux within a slider, the structure compensates the leakage flux and makes the motor to produce more thrust.

And placing both permanent magnets and windings on a slider side, an improvement in a tolerance to environmental conditions is achieved in addition to a cost advantage.

BRIEF DESCRIPTION OF THE DRAWINGS

FIG. 6 are two pieces of sectional view of the linear motor of FIG. 4 taken along the line E-F and G-H;

DESCRIPTION OF PREFERRED EMBODIMENTS

Figure 1:
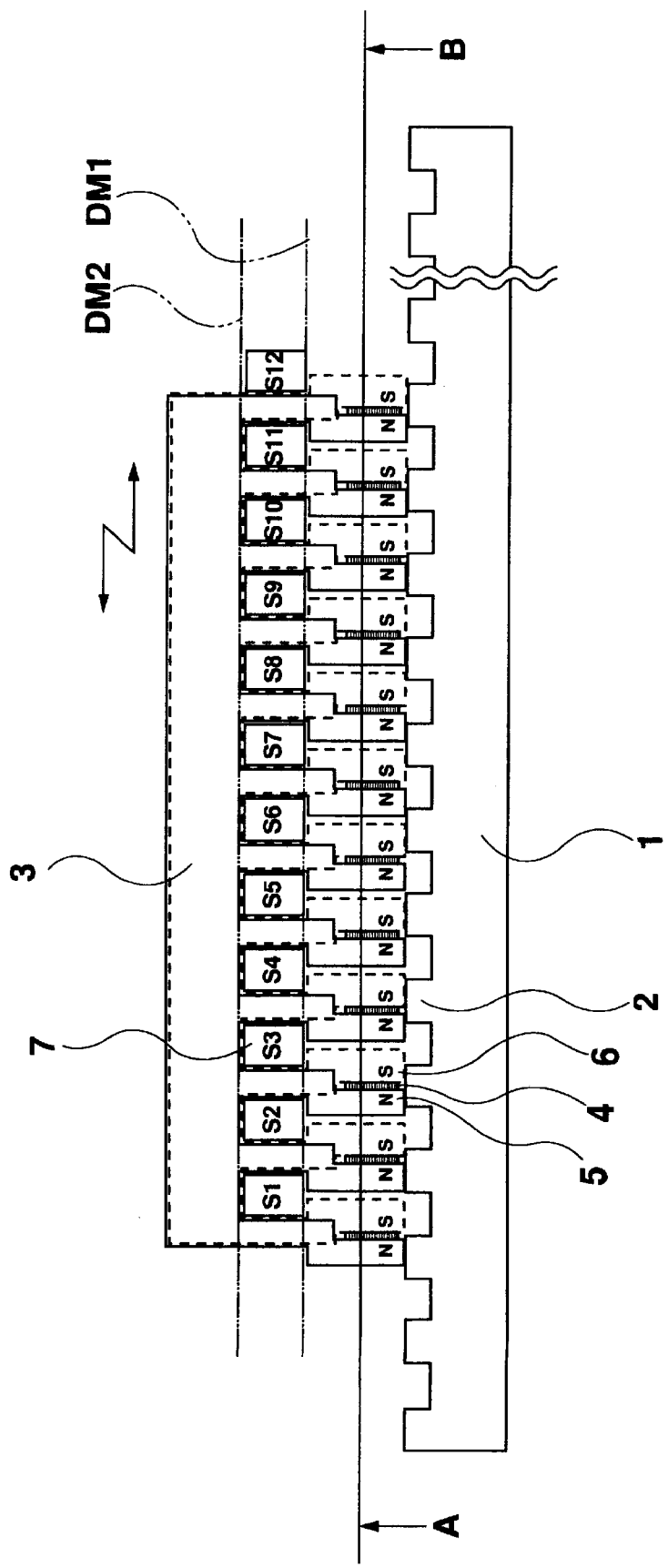
FIG. 1 is a sectional view of a linear motor in accordance with the first embodiment of this invention.

A cross-sectional view of a linear motor in accordance with a first embodiment of this invention is shown in FIG. 1.

Figure 3:
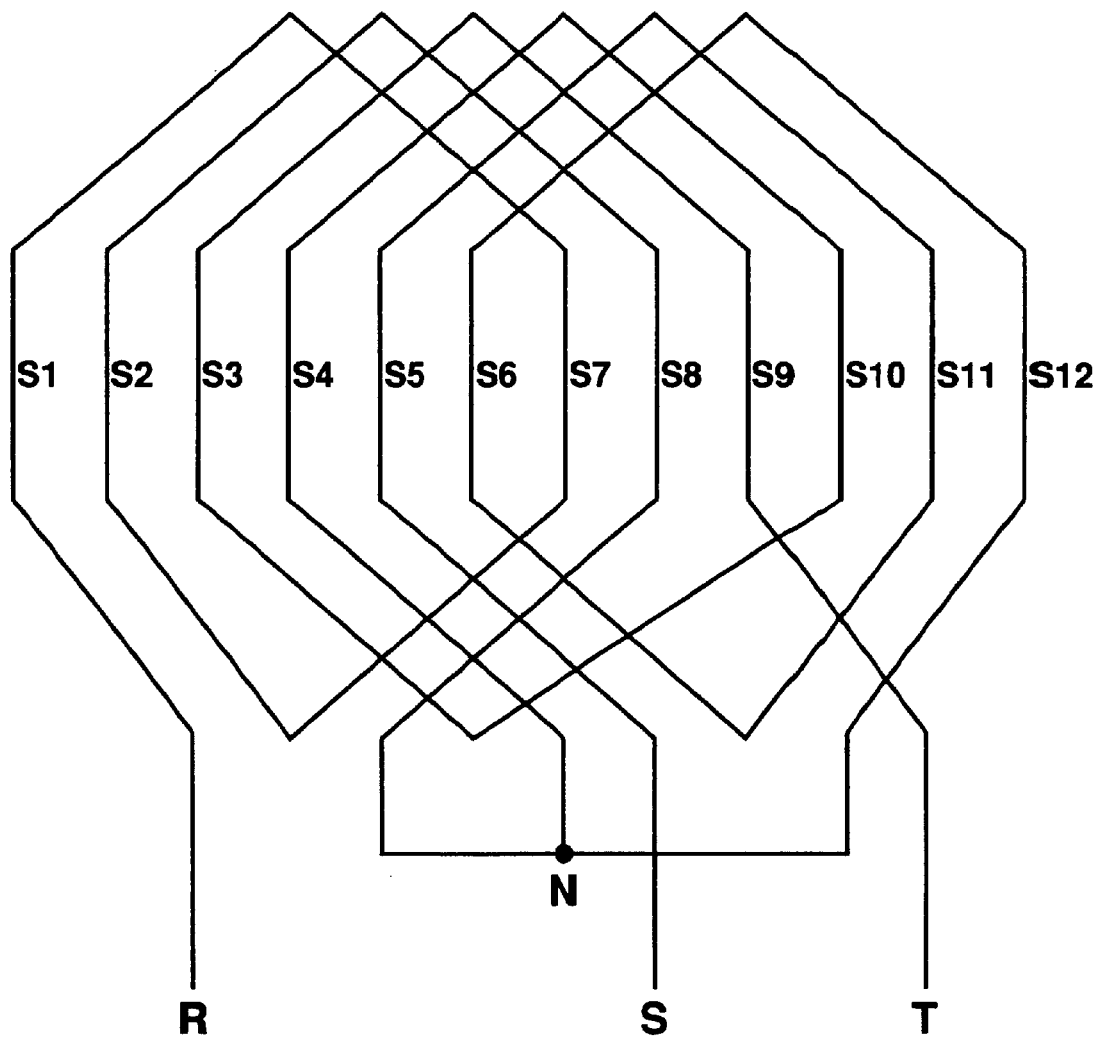
FIG. 3 is an example showing a wire-wound diagram of the linear motor of FIG. 1.

3 is a slider which forms a movable part and 7 is one of the slots on the slider 3 indicated by S1 to S12. A bipolar three-phase alternating current winding, commonly used for such a rotation-type induction motor, is wound to be aligned in a line in each slot. FIG. 3 illustrates a concrete example of their wire-wound diagram. R, S, and T are terminals of three-phase alternating current windings, and N is a neutral point just as in the case with the linear motor illustrated in FIG. 11 of a prior art.

The slider 3 is shaped rather complicated and has 12 sets of the magnetic pole N and the magnetic pole S placed side by side in the traverse direction of the slider shown by the arrow, in other words the side-to-side direction on the paper. 4 is a permanent magnet whose magnetism direction points the direction of hatched line and whose magnetic polarity is indicated in the figure as N and S. The slider 3 is comprised of electromagnetic steel laminated in the direction perpendicular to the traverse direction of the slider 3 i.e. from upper surface to down of the paper, in addition to permanent magnets. While, the material comprising the slider is not confined to electromagnetic steel but can be any soft magnetic material.

5 is the magnetic pole N which works as the magnetic north pole for a stator. The magnetic north pole 5 is also a part of a magnetic yoke for the pole N and magnetically linked with all the other north poles of each permanent magnet. The magnetic yoke for the pole N is indicated by a full line in FIG. 1 and that for the pole S that works in the same manner as the magnetic pole N is indicated by a broken line. 6 is the magnetic pole S.

Figure 2:
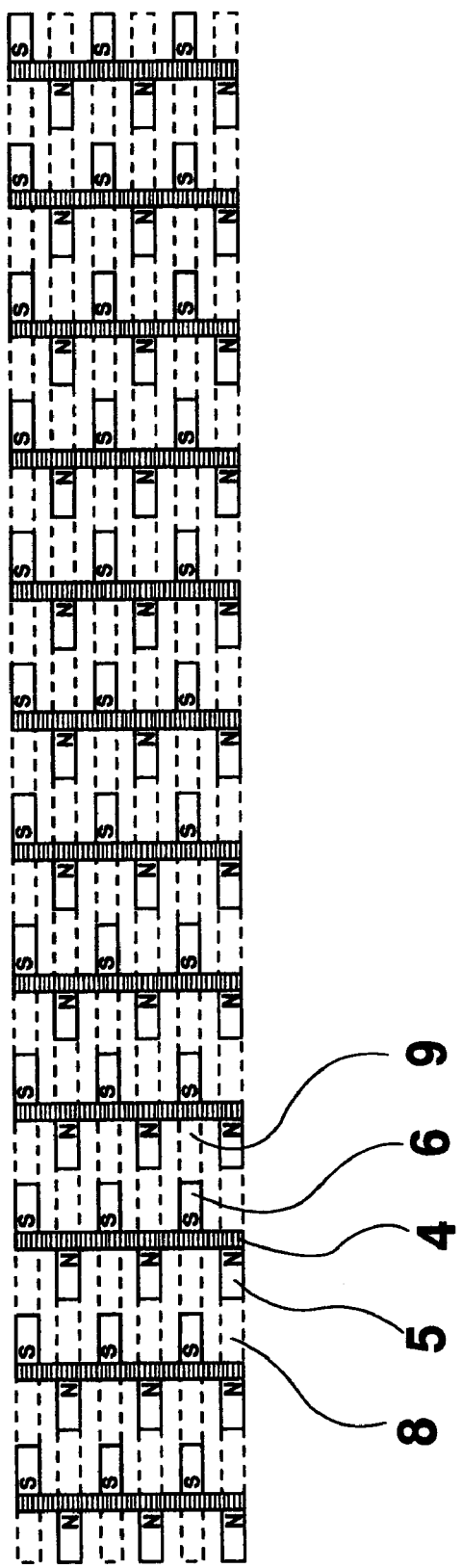
FIG. 2 is a sectional view of the linear motor of FIG. 1 taken along the line A-B.

As the magnetic north pole 5, the magnetic south pole 6, and the permanent magnet 4 are rather intricately constructed, a sectional view along the line A-B which is indicated in FIG. 1 is shown in FIG. 2. 8 indicated by a broken line represents the magnetic yoke for the pole N to which the magnetic north pole 5 is magnetically linked and 9 indicated by a broken line represents the magnetic yoke for the pole S to which the magnetic south pole 6 is magnetically linked. The magnetic yokes for the pole N and that for the pole S are constructed as to be insulated magnetically and placed alternately in a vertical direction of the paper as shown in FIG. 1.

1 is a stator and has a protruding pole 2 on the surface. The width of a projected part thereof is almost equal to that of a depressed part and magnetic reluctance in a traverse direction of a slider viewed from a side of the slider 3 changes between low and high alternately.

The slider 3 has 12 sets of the magnetic north pole 5 and the magnetic south pole 6 and the entire width of the 12 sets is the same as that of 11 protruding pole of a stator so that it is constructed as vernier structure.

Figure 11:
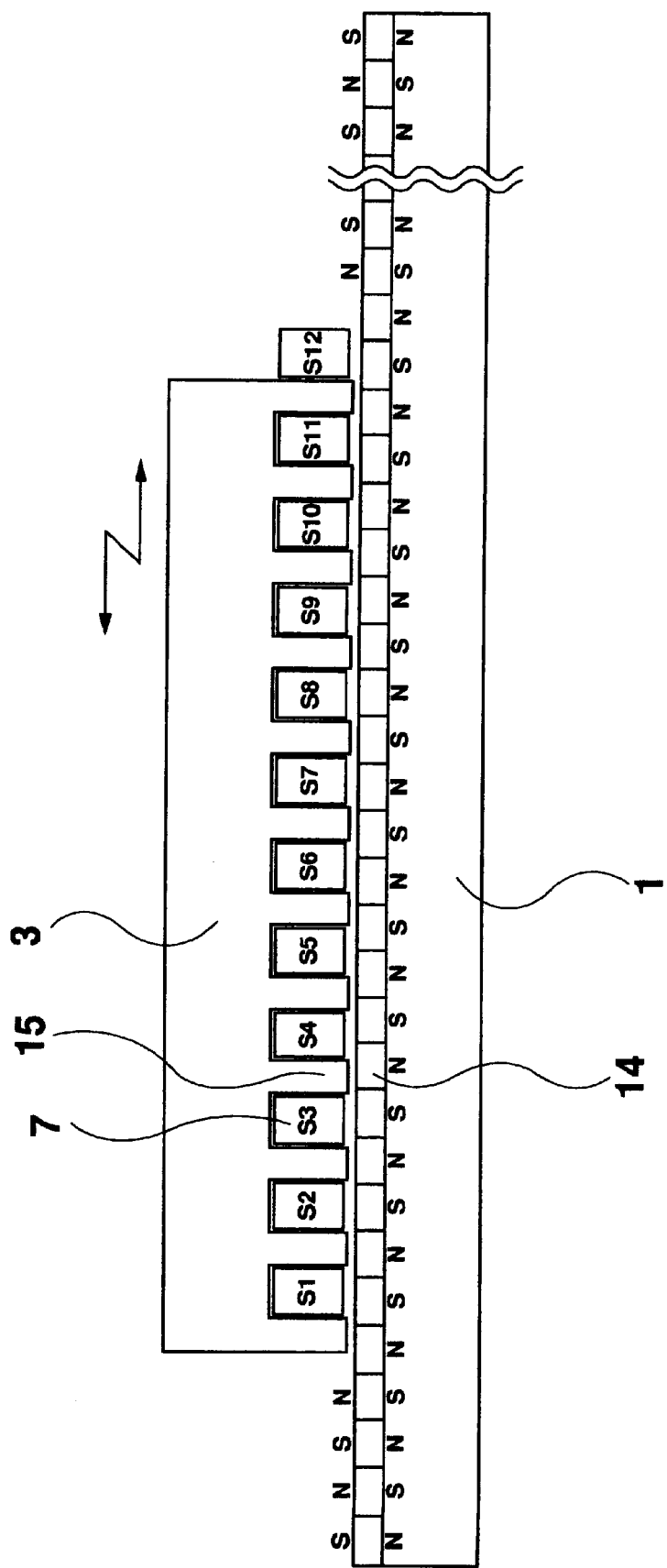
FIG. 11 is a sectional view of a linear motor in accordance with the prior art.

Referring now to the operation of the linear motor illustrated in FIG. 1, a basic concept of the operation is similar to the concept of the linear motor of a prior art in FIG. 11 stated already. Suppose that, for example, a single turn of winding is wound through a slot S2 and S8 in the direction from upper surface to bottom of the paper in which FIG. 11 is illustrated, at S2 and in the direction from down surface to top at S8. Speaking of the rate of change in location $d\phi/dX \approx \Delta\phi/\Delta X$ of flux linkage $\phi$ against the winding wound from the slot 2 to 8 in this case, infinitesimal movement of the slider of $\Delta X$ to the right causes infinitesimal change in magnetic flux $\Delta\phi$ as increase in magnetic flux of the pole N corresponding to the infinitesimal change in position $\Delta X$ on each tooth between the slot 2 and 8 of the slider. Therefore, letting a magnetic flux on a slider surface as BS and the width of a slider in the direction perpendicular to the paper surface as WS leads to $\Delta\phi/\Delta X \approx (5 \sim 6) \times BS \times WS \times \Delta X/\Delta X = (5 \sim 6) \times BS \times WS$. That is, the rate of change in magnetic flux density being 5 to 6 times of magnetic density BS is obtained so that a characteristics of a vernier structure exerts its effect. Another characteristics of this structure is that thrust ripple is reduced by the averaging effect owing to that $\Delta\phi/\Delta X$ is represented by the sum of several phases.

Referring now to the magnetic operation, each magnetic north pole 5 supplies magnetic flux to each protruding pole 2 of the stator 1. However, where the magnetic pole N does not face to the protruding pole of the stator, permanent magnets placed nearby supply magnetic flux not to the gap part having high magnet reluctance but to other protruding poles facing to a magnetic north pole 5 and having low magnet reluctance via the magnet yoke for the pole N. Each magnetic south pole 6 operates symmetrically to the magnet north pole 5 but in the same manner as that. As a consequence, magnetic flux generated by each permanent magnet 4 is effectively supplied to each protruding pole 2 of the stator 1 via the magnet yokes for the pole N and the pole S.

Figure 12:
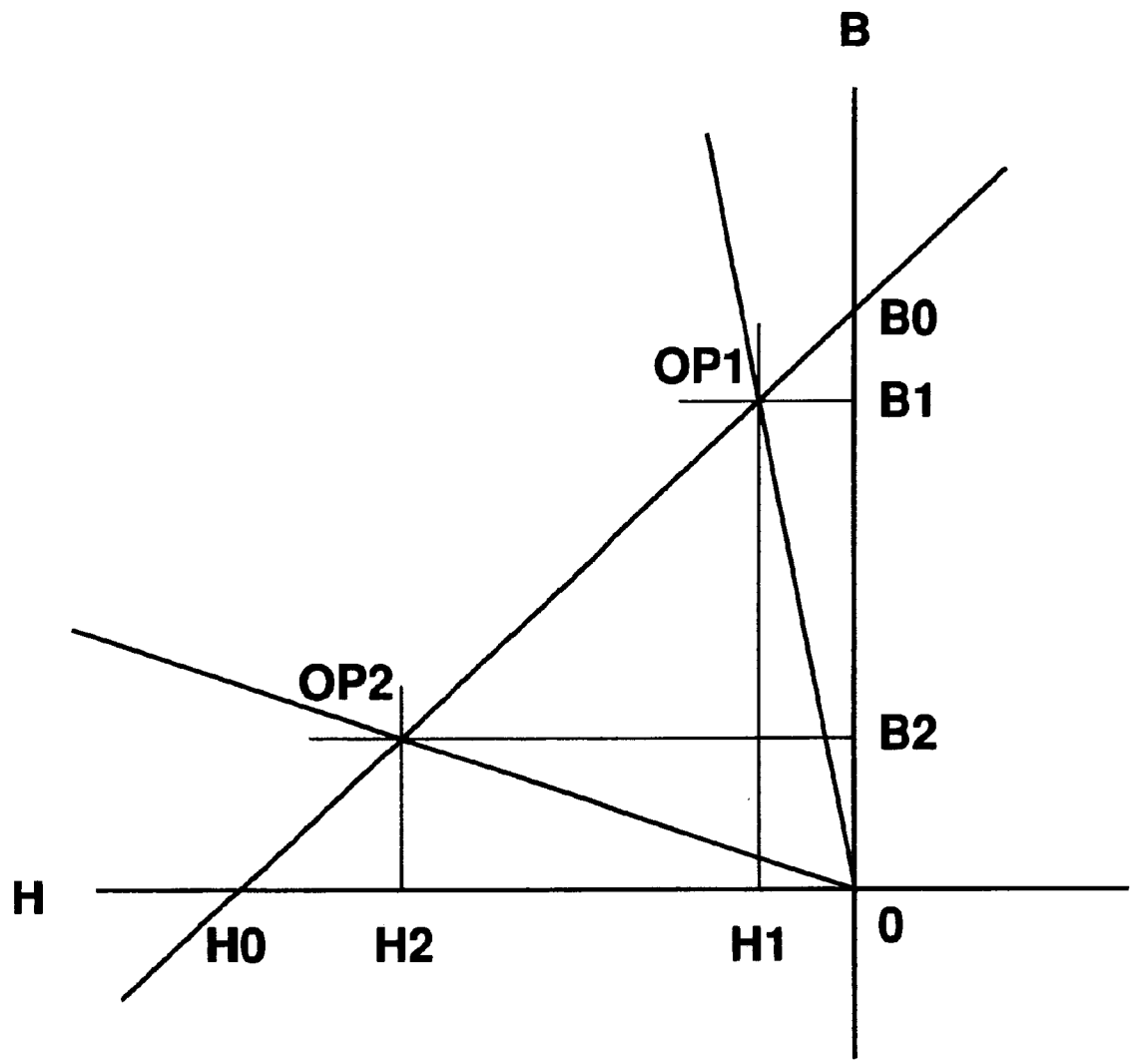
FIG. 12 is an operating characteristic diagram in regard to magnetic flux B and magnetomotive force H of a permanent magnet.

Referring to the BH characteristics of a permanent magnet shown in FIG. 12, every operating point of respective permanent magnets 4 is close to P1, therefore great magnetic flux equivalent to B1 efficiently works. The possibility acting at the operation point OP2, supplying major magnetomotive force H2 to a gap part having high magnetic reluctance, and generating the magnetic flux equivalent to B2 which interfere with the operation of a motor as in the case of the linear motor of a prior art shown in FIG. 11 is very few.

As installation of windings S1 to S12 with the structure indicted by a section view in FIG. 1 is difficult as it is, concrete method to install windings is stated below. For example, disconnect the slider 3 into upper side and down side along a dotted-dashed line DM1 or DM2 and fix both sides after placement of windings. To fix them, various means such as bolting them between fixing plates set on both sides of the slider 3 can be adopted. And it is efficient to take on the structure being resistant to thrust which acts in a traverse direction of the slider by shaping projected part and depressed part on each side against the traverse direction in a junction between them. Similarly, it is possible to shape electromagnetic steel on a junction between the between the slider 3 and the stator 1 to be projected part and depressed part each other in the direction perpendicular to the paper surface in order to be resistant to the force of attraction between them.

As strength tends to be low in the place around a permanent magnet where a plurality of parts is assembled, it is efficient to insert a SUS plate in places between electromagnetic steel. In this case, as a matter of course, SUS plate should be punched with minimum number of poles to keep required strength.

Referring to an application of a linear motor shown in FIG. 1 without using a figure, while, in the example shown in FIG. 1, a three-phase winding has two sets of windings in each phase as shown in wire-wound diagram of FIG. 3, it is possible to be a convergence winding, have three sets of windings, and have 6 slots. This makes winding structure simple. In accordance with this, it is possible to shape two or three of plural protruding poles on the surface of the magnet pole N and the pole S in order to double electromagnetic operation. In this case, the pitch of the plural protruding poles is required to be approximate value to the pitch of the magnetic pole N of the slider shown in FIG. 1.

Although only three-phase alternating current winding is depicted about the first embodiment, two-phase, four-phase, or five-phase alternating current winding can be adopted even though they are not mentioned.

The permanent magnets 4 placed on alternate interspace between the magnetic pole N and the pole S are explained, but it is possible to place those on spaces shown as gap in FIG. 1 in order to increase magnetic flux further more.

The windings are equipped on a slider side in this embodiment, but it is possible to be equipped on a stator side.

Above those, this embodiment is mentioned with reference to a linear motor, but it is possible to apply a rotary-type motor by deforming to a circular shape.

Figure 4:
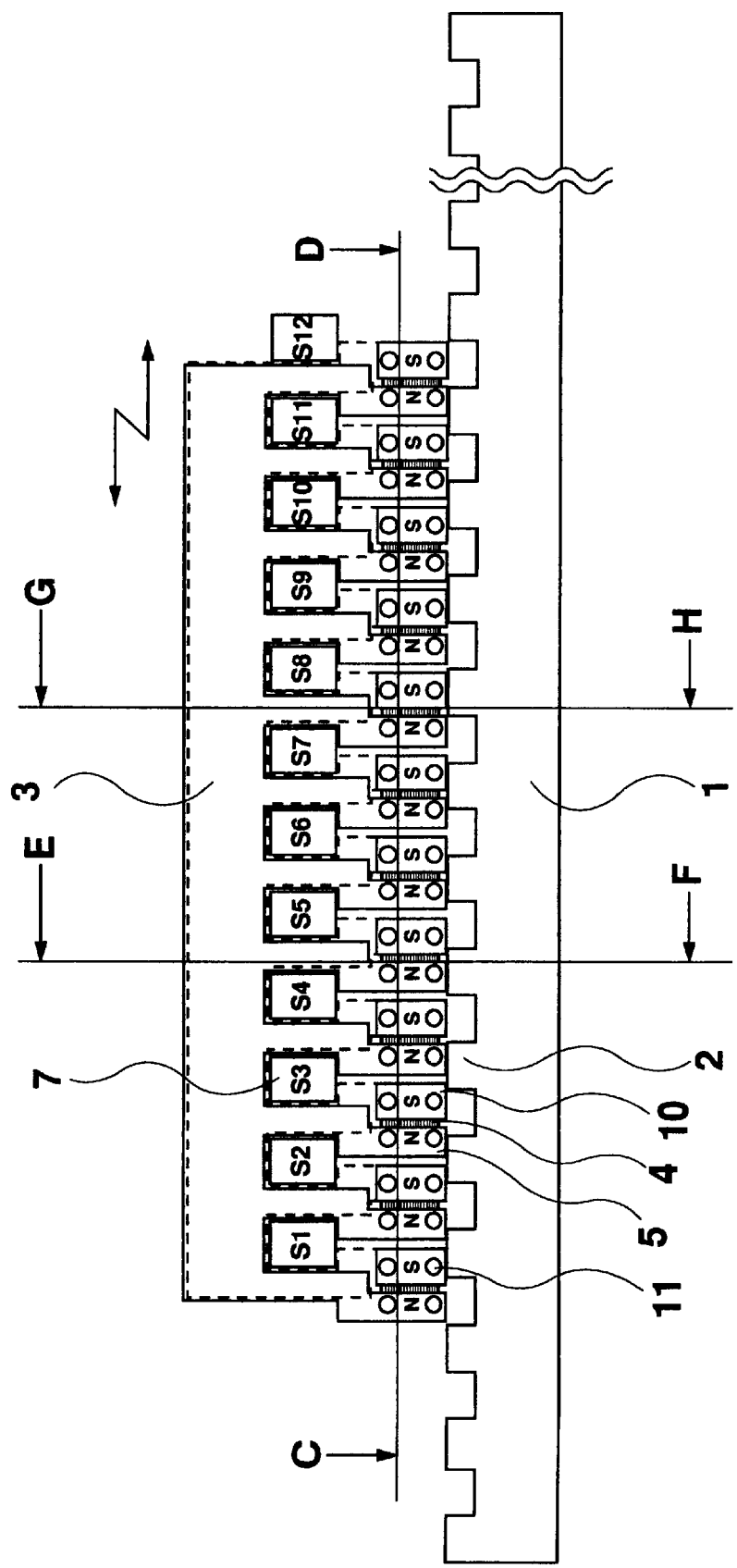
FIG. 4 is a sectional view of the linear motor in accordance with the second embodiment of this invention.
Figure 5:
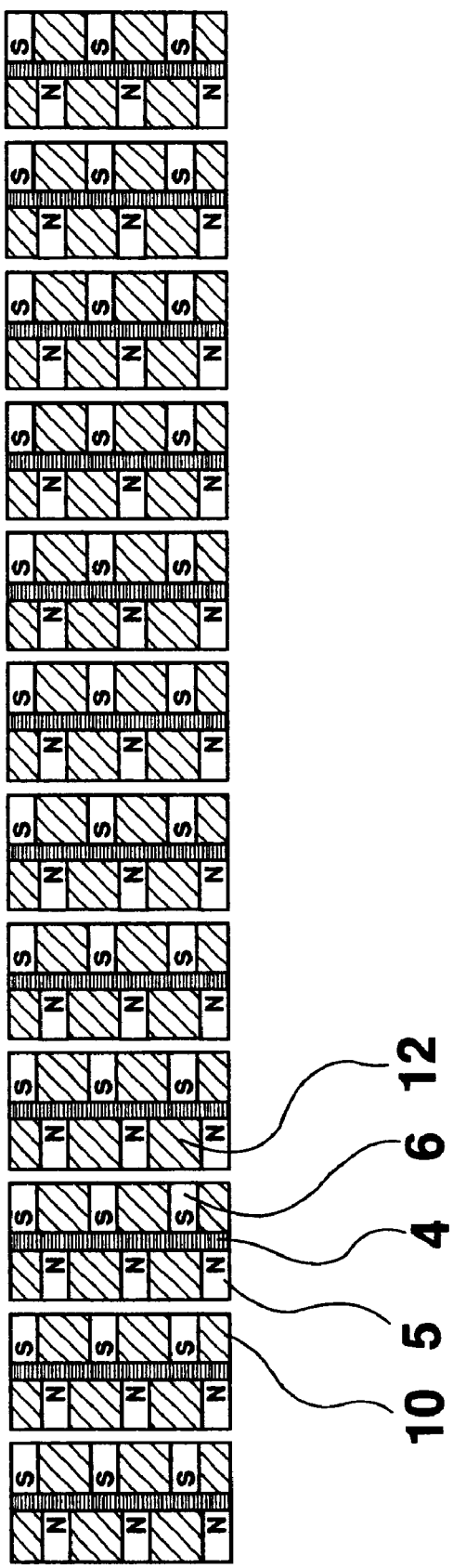
FIG. 5 is a sectional view of the linear motor of FIG. 4 taken along the line C-D.

The sectional view of the linear motor that is a second embodiment of the present invention is depicted in FIG. 4. Basic concept of the linear motor of the second embodiment is identical with that shown in FIG. 1. A cross-sectional view of section C-D is shown in FIG. 5. In contrast to the motor described in FIG. 1 and FIG. 2, auxiliary magnetic north poles 12 and auxiliary magnetic south poles 10 indicated in FIG. 4 and FIG. 5 are added. Each magnetic pole of the slider is not successive in the direction from upper surface to down of the paper with reference to the linear motor described in FIG. 1 and FIG. 2, but the linear motor of FIG. 4 and FIG. 5 is constructed that each magnetic pole of the slider is placed successively in the direction perpendicular to a traverse direction of the slider. FIG. 6 illustrates two pieces of cross-sectional view of section E-F and section G-H of FIG. 4. A magnetic yoke of the slider 3 is constructed with laminated electromagnetic steel of required shape punched by a press in a direction from upper surface to down of the paper in which FIG. 4 is indicated. 11 is a staking part to laminate electromagnetic steel automatically with a press and constructed as follows: in order to crimp and fix each electromagnetic steel mutually, a press excludes about half thickness of a circular shape comprising a staking part for fitting electromagnetic steel adjacent to each other.

From a manufacturing viewpoint, it is useful to leave each small part of a slider connecting without disconnecting respective magnetic north poles 5 and magnetic south poles 10 illustrated in FIG. 4. This prevents individual parts of electromagnetic steel from being dispersed when punched by a press for the sake of advantages for processing or assembly. The connection of respective parts of a slider is not necessary for electromagnetic operation and the magnetic path is rather detrimental because magnetic flux of each magnetic pole leaks owing to the connection.

Referring now to the operation of the linear motor depicted in FIG. 4, as auxiliary magnetic north poles 12 and auxiliary magnetic south poles 10 are added in this embodiment, magnetic reluctance in the slider is smaller than that in the motor indicated in FIG. 1. Hence, in this structure magnetic flux of each permanent magnet 4 is efficiently supplied to each magnetic pole on the stator 2 and thrust of the linear motor increases.

Figure 7:
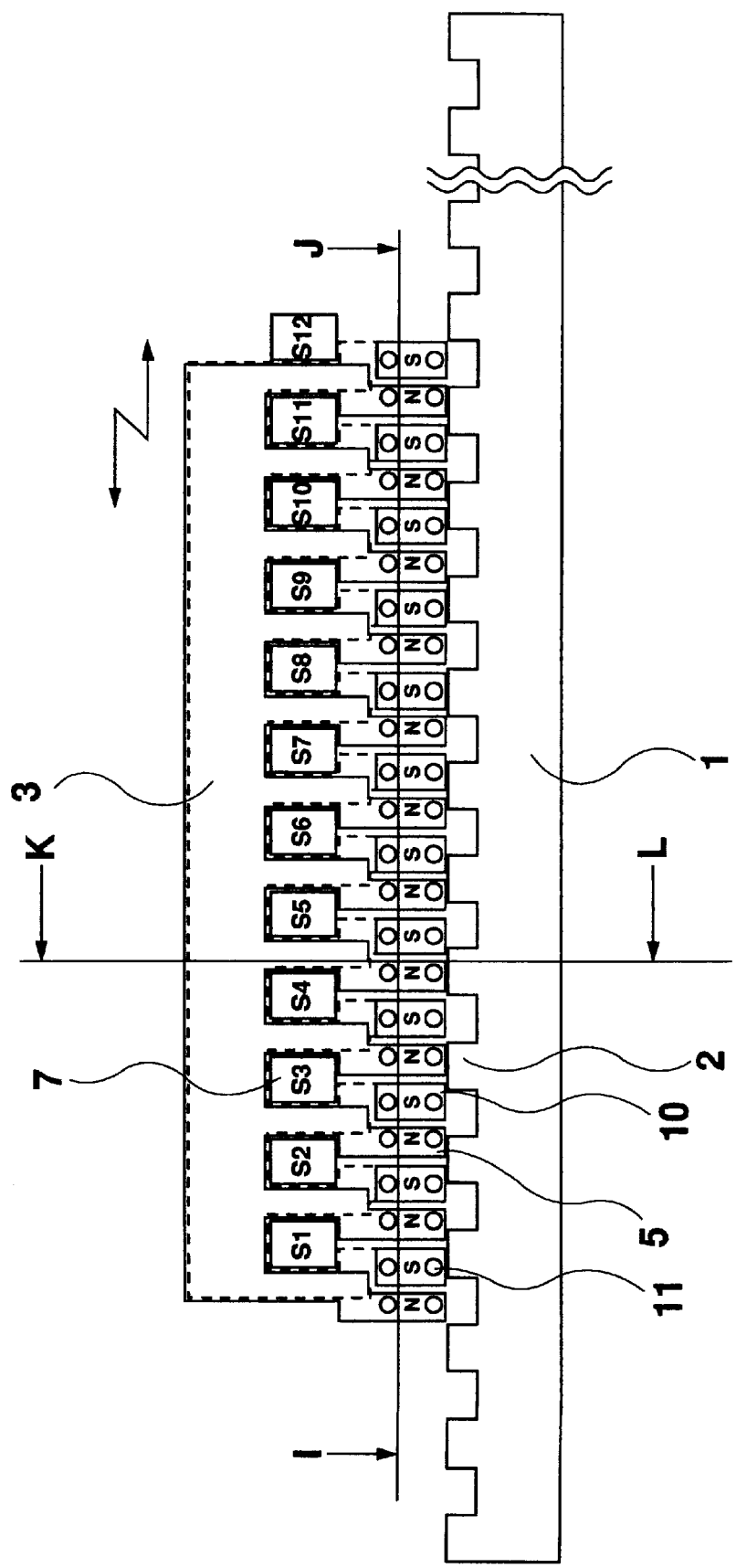
FIG. 7 is a sectional view of a linear motor in accordance with the third embodiment of this invention.
Figure 8:
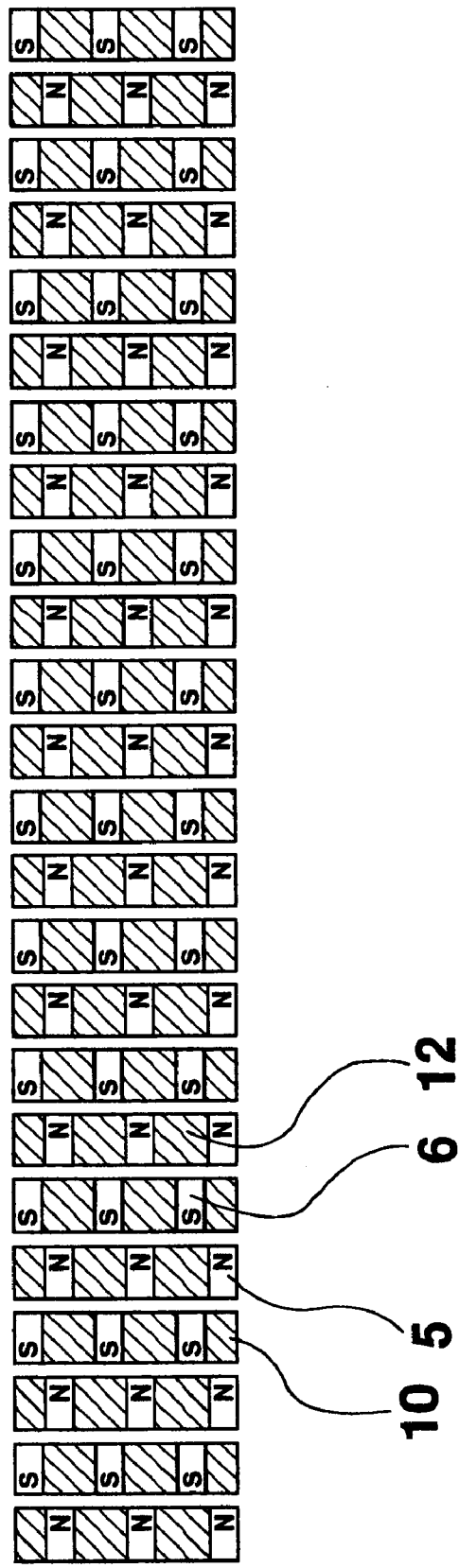
FIG. 8 is a sectional view of the linear motor of FIG. 7 taken along the line I-J.
Figure 9:
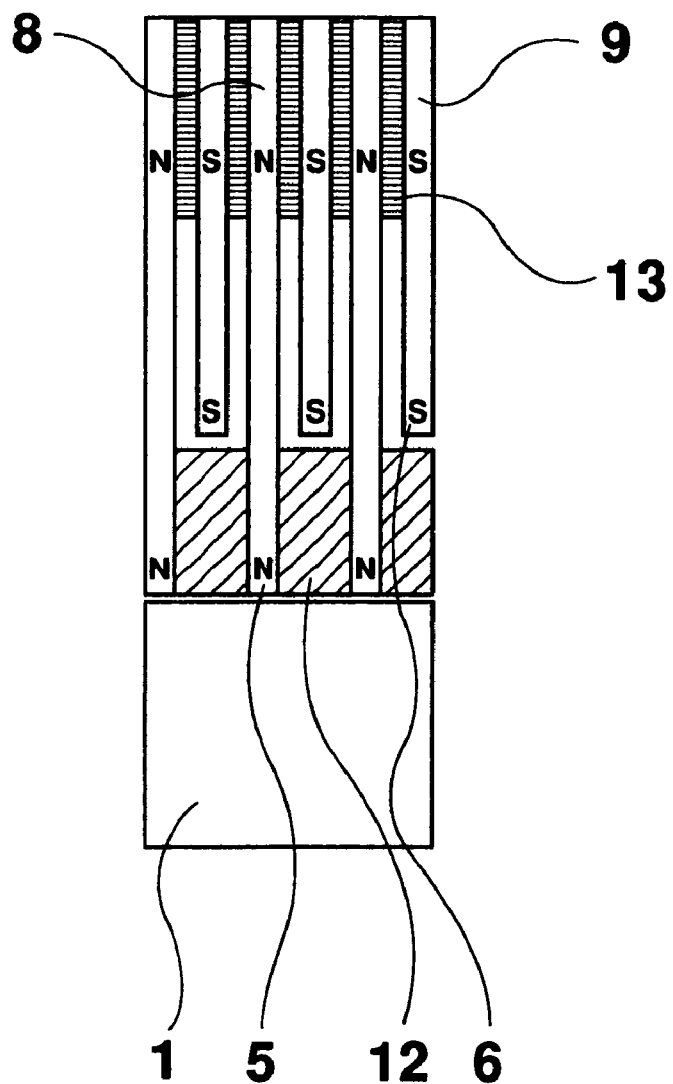
FIG. 9 is a sectional view of the linear motor of FIG. 7 taken along the line K-L.

The sectional view of the linear motor that is a third embodiment of this invention is depicted in FIG. 7. A cross-sectional view of section I-J is illustrated in FIG. 8 and that of section K-L is in FIG. 9. Basic concept of this embodiment is identical with the linear motor shown in FIG. 4 but individual permanent magnets 4 are not attached in the place close to a slider surface and a common permanent magnet 13 indicated in FIG. 9 is attached, as a substitute for those, between a magnetic yoke for the north pole 8 and a magnetic yoke for the south pole 9 within a slider.

The operation of the motor of the third embodiment is similar to the linear motor shown in FIG. 1 and FIG. 4 and, as stated above, a common permanent magnet 13 attached within a slider supplies magnetic flux to each magnetic north pole 5, auxiliary magnetic north pole 12, each magnetic south pole 6, and auxiliary magnetic south pole 10. In comparison to the linear motor shown in FIG. 1 or FIG. 4, the linear motor in the third embodiment needs few permanent magnets and has the advantage that a motor is simplified.

Referring now to another example modification of this invention, this is a linear motor identical to one described in FIG. 4 and FIG. 5 but a permanent magnet 13 indicated in FIG. 13 is added to therein. Therefore a cross-sectional view of the slider along its traverse direction is shown in FIG. 5 and a cross-sectional view of section E-F is shown in FIG. 9. As the respective magnetic poles N and the poles S of every linear motor in this invention are distributed crosswise and closely to each other, their respective boundary area is constructed with such as a gap so as to increase magnetic flux and decrease leakage flux. However, owing to the limitations of structure on gap width and so on, considerable amount of leakage flux may appear. Referring to the linear motor, which is identical to one described in FIG. 4 but a permanent magnet 13 is added to, from the aspect with reference to compensation for leakage flux, the permanent magnet 13 reduces leakage flux and supplies magnetic flux to each magnetic north pole 5, auxiliary magnetic north pole 12, magnetic south pole 6, and auxiliary magnetic south pole 10 in parallel, from the viewpoint of a magnetic circuit, with individual permanent magnets 4 on the place close to the slider surface. This makes magnetic flux on each magnetic pole high and makes thrust generated by a linear motor increase.

Figure 10:
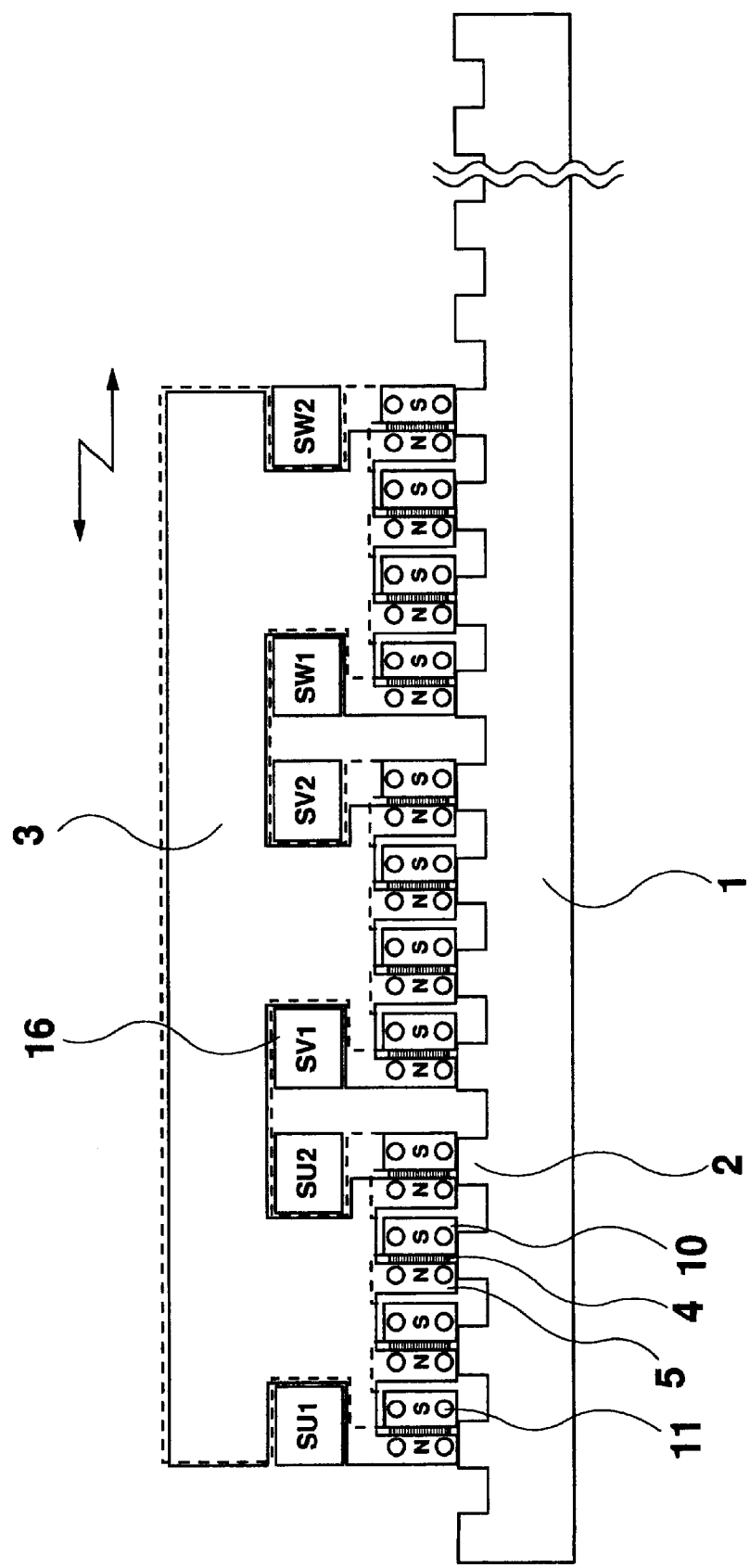
FIG. 10 is a sectional view of a linear motor in accordance with the forth embodiment of this invention.

The linear motor which is a forth embodiment of this invention is depict in FIG. 10. Three sets of magnetic pole of a slider having four sets of a magnetic pole N and a magnetic pole S respectively are mounted on a slider 3. And three-phase alternating current windings are wound around each magnetic pole of a slider. U-phase windings are indicated by symbols of SU1 and SU2 in the figure, V-phase windings by symbols of SV1 and SV2, and W-phase windings by symbols of SW1 and SW2. Each magnetic pole of a slider of respective phases is located on the position shifting every 120 degrees in terms of electrical degree. Electromagnetic steel of the slider 3 indicated by a full line is a magnetic yoke for the pole N and that indicated by a dotted line is a magnetic yoke for the pole S. A common permanent magnet is placed on the auxiliary magnetic south pole 10, auxiliary magnetic north pole and in the slider (not illustrated). The linear motor of the forth embodiment of this invention is not vernier structure contrasted with other embodiments and constructed of windings of each phase which are located so as to be independent of magnetic poles. This has the advantages that the structure can be simple and manufacturing can be easy.

Although the embodiments of this invention has been described, modification and application within the scope of the invention, such as changes from three-phase alternating current linear motor to that of other phase, partial deletion of permanent magnets, alteration of shape, are intended to be embraced by this invention.

This invention has effect of increasing thrust of a linear motor owing to reducing magnetomotive force and magnetic flux that interfere with the action of a linear motor and making effective use of performance of a permanent magnet within a limited space and with high density.

Simultaneously, miniaturization and low cost will be achieved and, as a consequence of an increase of trust per a winding, high efficiency and reduction of a heating value also will be done.

On the other hand, as permanent magnets and windings are only placed on the slider side, even the linear motor with a long stroke is inexpensive.

Each magnet pole is constructed by forming electromagnetic steel so that designing flexibility about a magnetic circuit becomes high. And this allows not only magnetic flux of each magnetic pole to increase until saturation flux density of iron, which leads to high efficiency, but also such as ferrite permanent magnet, which is considerably cheap but with low magnetic flux density, to be effectively used.

In general, the linear motor in which wire-wound current significantly changes internal magnetic flux of the linear motor, such as a reluctance-type linear motor, features that winding inductance is high and power factor is low. As for a linear motor of this invention, variations in magnetic flux generated by wire-wound current is basically little because magnetic flux is almost controlled by a permanent magnet. As a consequence of this, winding inductance is low, power factor is high, and operation for electric control is easy.

In addition, as permanent magnets are only placed on the slider side, dust-resistant means against steel dust is made with relative ease.

What is claimed is:

1. A synchronous motor comprising:
    a plurality of individual permanent magnets attached on the inside of a movable part thereof,
    a magnetic yoke for the pole N located in said movable part and commonly connected to each magnetic pole N of a plurality of said individual permanent magnets,
    a magnetic yoke for the pole S located in said movable part and commonly connected to each magnetic pole S of a plurality of said individual permanent magnets,
    a magnetic pole N in the shape of protruding pole which forms a part of said magnetic yoke for the pole N and being located at the place facing a stator,
    a magnetic pole S in the shape of protruding pole which forms a part of said magnetic yoke for the pole S and being located along a traverse direction of said movable part between said magnetic pole N,
    a three-phase alternating current winding being wound in such a manner as to correspond to the magnetic pole N and the pole S and being attached on the inside of said movable part, and
    said stator wherein parts of which magnetic reluctance is high and parts of which magnetic reluctance is low are located alternately in a traverse direction of said movable part and the pitch thereof is different from the pitch of magnetic poles attached on said movable part.

2. A synchronous motor incorporating said permanent magnets according to claim 1, comprising an auxiliary magnetic north pole which connects a magnetic pole N and another adjoining magnetic pole N, and
    comprising an auxiliary magnetic south pole which connects a magnetic pole S and another adjoining magnetic pole S,
    wherein a magnetic yoke for the pole N and a magnetic yoke for the pole S are located alternately.

3. A synchronous motor comprising;
    a common permanent magnet which is common to each magnetic pole of a movable part thereof and attached on the inside of said movable part,
    a magnetic yoke for the pole N located in said movable part and commonly connected to the magnetic pole N of said common permanent magnet,
    a magnetic yoke for the pole S located in said movable part and commonly connected to the magnetic pole S of said common permanent magnet,
    a magnetic pole N in the shape of protruding pole which forms a part of said magnetic yoke for the pole N and being located at the place facing a stator,
    a magnetic pole S in the shape of protruding pole which forms a part of said magnetic yoke for the pole S and being located along a traverse direction of said movable part between said magnetic pole N,
    a three-phase alternating current winding being wound in such a manner as to correspond to the magnetic pole N and the pole S and being attached on the inside of said movable part, and
    said stator wherein parts of which magnetic reluctance is high and parts of which magnetic reluctance is low are located alternately in a traverse direction of said movable part and the pitch thereof is different from the pitch of said magnetic poles attached on said movable part.

4. A synchronous motor according to claim 2, wherein a common permanent magnet, which is common to each magnetic pole of a movable part thereof, is attached on the inside of said movable part.

5. A synchronous motor comprising;
    convergence magnetic poles, shifting 120 degrees in terms of electrical degree against a stator each other, attached on the inside of a movable part thereof, wherein parts of which magnetic reluctance is high and parts of which magnetic reluctance is low are located,
    three-phase alternating current windings of which any-phase winding is wound around each said convergence magnetic pole,
    a plurality of permanent magnets attached on the inside of said movable part,
    a magnetic yoke for the pole N which is commonly connected to said permanent magnets at the inside of said movable part,
    a magnetic yoke for the pole S which is commonly connected to said permanent magnets at the inside of said movable part, and
    a stator wherein parts of which magnetic reluctance is high and parts of which magnetic reluctance is low are located alternately in a traverse direction of said movable part and the pitch thereof is different from the pitch of said convergence magnetic poles attached on said movable part.

* * * * *